United States Patent
Ochs et al.

(10) Patent No.: US 10,621,357 B2
(45) Date of Patent: Apr. 14, 2020

(54) OFF NODE SCANNING

(71) Applicant: Microsoft Technology Licensing, LLC, Redmond, WA (US)

(72) Inventors: Rebecca Jean Ochs, Des Moines, WA (US); Ramesh Chinta, Sammamish, WA (US); Amrita Satapathy, Redmond, WA (US); Jeffrey Cooperstein, Redmond, WA (US); Harini Parthasarathy, Redmond, WA (US); Scott Antony Field, Redmond, WA (US); Mohamed Rouatbi, Bellevue, WA (US); Julian Federico Gonzalez, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

(21) Appl. No.: 15/692,393

(22) Filed: Aug. 31, 2017

(65) Prior Publication Data
US 2019/0065754 A1    Feb. 28, 2019

(51) Int. Cl.
G06F 21/00 (2013.01)
G06F 21/57 (2013.01)
G06F 21/56 (2013.01)
G06F 21/53 (2013.01)

(52) U.S. Cl.
CPC ............ *G06F 21/577* (2013.01); *G06F 21/53* (2013.01); *G06F 21/56* (2013.01); *G06F 2221/034* (2013.01)

(58) Field of Classification Search
CPC ........ G06F 21/56; G06F 21/53; G06F 21/577; G06F 2221/034
See application file for complete search history.

(56) References Cited

U.S. PATENT DOCUMENTS

| | | | |
|---|---|---|---|
| 8,056,076 B1 * | 11/2011 | Hutchins | G06F 9/461 707/639 |
| 8,220,053 B1 | 7/2012 | Sun et al. | |
| 8,595,822 B2 | 11/2013 | Schrecker et al. | |
| 8,667,593 B1 | 3/2014 | Shnitzer | |
| 8,819,832 B2 | 8/2014 | Li et al. | |
| 9,361,145 B1 * | 6/2016 | Wilson | G06F 9/45558 |
| 9,438,634 B1 | 9/2016 | Ross et al. | |
| 9,836,327 B1 * | 12/2017 | Brouwer | G06F 9/5077 |
| 9,977,698 B2 * | 5/2018 | Bookman | G06F 9/4856 |

(Continued)

OTHER PUBLICATIONS

"International Search Report and Written Opinion Issued in PCT Application No. PCT/US2018/039632", dated Sep. 24, 2018, 11 Pages.

(Continued)

*Primary Examiner* — Don G Zhao
(74) *Attorney, Agent, or Firm* — Workman Nydegger

(57) ABSTRACT

Security risks associated with scanning a computer are at least mitigated by performing the scanning off node. State data of a target node, or computer, can be acquired in various ways. The acquired state data can be subsequently employed to generate a virtual replica of the target computer or portion thereof on a second computer isolated from the target computer. The virtual replica of the target computer provides a scanner access to the data needed to perform a scan on the second computer without accessing or being able to impact the target computer.

20 Claims, 12 Drawing Sheets

(56) References Cited

U.S. PATENT DOCUMENTS

| | | | | |
|---|---|---|---|---|
| 2003/0131253 | A1* | 7/2003 | Martin | G06F 11/1471 726/6 |
| 2005/0289169 | A1* | 12/2005 | Adya | G06F 11/1482 |
| 2005/0289414 | A1* | 12/2005 | Adya | G06F 11/1441 714/724 |
| 2006/0136720 | A1* | 6/2006 | Armstrong | G06F 21/53 713/164 |
| 2008/0263658 | A1 | 10/2008 | Michael et al. | |
| 2009/0007100 | A1* | 1/2009 | Field | G06F 21/53 718/1 |
| 2009/0271863 | A1* | 10/2009 | Govindavajhala | G06F 21/577 726/23 |
| 2012/0042196 | A1* | 2/2012 | Aron | G06F 11/2028 714/4.11 |
| 2014/0101652 | A1* | 4/2014 | Kamble | G06F 9/45558 717/171 |
| 2014/0245376 | A1* | 8/2014 | Hibbert | H04L 63/1433 726/1 |
| 2015/0286530 | A1 | 10/2015 | Coronado et al. | |
| 2016/0350539 | A1 | 12/2016 | Oberheide et al. | |
| 2017/0139791 | A1 | 5/2017 | Hagan et al. | |
| 2017/0147819 | A1* | 5/2017 | Vasilenko | G06F 21/566 |
| 2017/0244761 | A1* | 8/2017 | Baukes | H04L 41/0816 |
| 2017/0374099 | A1* | 12/2017 | Kokubu | G06F 21/562 |

OTHER PUBLICATIONS

Man, Jane, "Live Monitoring with Endpoint Agents", https://community.rapid7.com/community/nexpose/blog/2016/09/28/live-monitoring-for-endpoints, Published on: Sep. 28, 2016, 13 pages.

"Network Vulnerability Assessment", https://www.beyondtrust.com/products/retina-network-security-scanner/, Published on: 1999, 13 pages.

Ashbourn, Julian, "Vulnerability with Regard to Biometric Systems", In Publication of EE Times, Jun. 20, 2002, 3 pages.

"Vulnerability Analysis", http://www.pentest-standard.org/index.php/Vulnerability_Analysis, Published on: Aug. 16, 2014, 10 pages.

Crawley, Kim, "Network Vulnerability Scanner", https://www.alienvault.com/solutions/network-vulnerability-scanning, Published on: Aug. 29, 2017, 11 pages.

"Qualys FreeScan", https://www.qualys.com/forms/freescan/, Published on: Jul. 4, 2017, 2 pages.

"Understanding Symantec's Vulnerability Assessment Scan", https://www.sslsupportdesk.com/understanding-symantecs-vulnerability-assessment-scan/, Published on: Sep. 25, 2015, 5 pages.

* cited by examiner

OFF NODE SCANNING

BACKGROUND

One of a variety of reasons to scan a computer is to evaluate whether vulnerabilities exist. Vulnerability scanning, analysis, or assessment, involves scanning a computer to identifying vulnerabilities, or in other words flaws or holes that could be exploited by an attacker. Vulnerability analysis can be unauthenticated or authenticated. Unauthenticated vulnerability scanning is typically performed from an external vantage point without credentials. Authenticated vulnerability scanning, by contrast, is performed with credentials, for instance to detect flaws associated with an attacker accessing the computer as an authenticated user. A desire to ensure computer security as well as satisfy compliance requirements motivates performance of computer scans, including vulnerability scanning.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to off node scanning. State data of a target computer is collected, in one instance from the target computer by way of a collection component or agent. Based on the collected state data, a virtual replica of the target computer is generated on a different computer isolated from the target computer. A computer scanner requests data of the target computer. An interface receives the request, retrieves data from the virtual replica of the target computer and returns data that satisfies the request to the requesting computer scanner. Stated differently, a scan is performed not on the target node, or computer itself, but rather off the target node on a virtual replica.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Conventional scanning of a computer, for example relating to authenticated vulnerability analysis, can ironically create security risks or holes in the computer. Authenticated vulnerability analysis is performed by scanning a computer for vulnerabilities or flaws that could be exploited from an insider vantage point, as an authenticated user. There are two approaches to perform authenticated vulnerability scanning. The first approach is to install and execute a scanner on a target computer, known as an on-node scan or scanner. The second approach is to remotely access the computer, known as a network scan or scanner. Both approaches, however, introduce risks, especially if a third party provides the scanner. For instance, since on-node scanners are running on the computer and network scanners require administrator credentials and an open communication port, any errors, faults, or flaws of the scanner can cause the computer to malfunction or crash, or potentially enable a computer to be controlled by someone who develops or maintains the scanner.

Details below generally pertain to off-node scanning. Security, reliability, and operational risks associated with scanning are at least mitigated by performing scanning off node. System state data of a target node or computer can be collected from the target computer, for example by executing a collection agent on the target computer or from a copy of a virtual hard disk provided by a storage service. The state data can subsequently be employed to generate a virtual replica of the target computer on a second computer. The virtual replica of the target computer provides a scanner access to state data of the target computer isolated from the target computer. In other words, a scan can be performed without a scanner having access to the target computer or the ability to impact execution of the target computer. Computer scanning can thus be performed in a way that substantially reduces security risks associated with conventional techniques.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
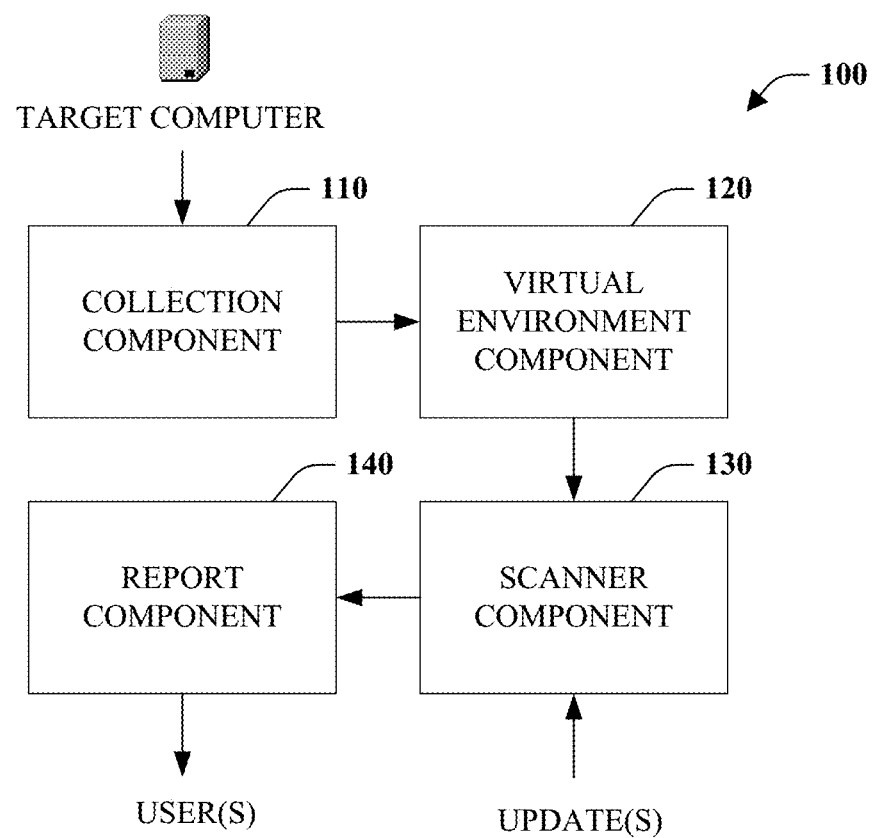
FIG. 1 is a block diagram of an off-node scanning system.

Referring initially to FIG. 1, an off-node scanning system 100 is illustrated. The scanning system 100 provides a mechanism to reduce risks associated with authenticated scanning including, for example, vulnerability, reliability, security, analytics, and forensic scanning. Reduction of risk can be accomplished by performing scanning off node on a computer isolated from a target computer subject to a scan.

Scanning is thus performed without a scanner having access to the target computer itself or the ability to impact execution of the target computer. The scanning system 100 includes collection component 110, virtual environment component 120, scanner component 130, and report component 140. The collection component 110 provides a mechanism to collect system state data from a target computer. The virtual environment component 120 generates a virtual environment, such as a virtual replica, on a separate computer or node for the target computer. The scanner component 130 interacts with a virtual environment to acquire data for analysis in accordance with a scan type, and the report component 140 outputs a report based on the result of a scan.

The collection component 110 is a mechanism that collects system state data for a computer. Although not limited thereto, a computer can include a server, host machine, guest machine, or bare metal machine. The collection component 110 also makes the collected data accessible for further processing, for example by communicating the system state data to another component or saving the system state data to a store, such as a network-accessible store (e.g. cloud store, file store, etc.). The collection component 110 can collect full system state data or a subset thereof, for example targeted for a particular type of scan. The system state data, or simply system state, can include a directory listing and optionally file content, and where applicable, registry entries, among other things, to enable full replication of a computer or a portion thereof. There are a variety of ways to implement the collection component 110 depending in part on the type of computer targeted for a scan.

In accordance with one embodiment, the collection component 110 can be executed on a target computer. In this embodiment, the collection component 110 can be developed by the same vendor or entity as the platform on which the target computer executes (e.g., cloud computing platform, operating system . . . ). In other words, the collection component 110 can be a second-party component, as opposed to a first-party user component or independent third-party component. In one instance, the collection component 110 can collect the system state data by interacting with and requesting such data from the operating system of the target computer. In another instance, the collection component 110 can bypass the operating system, if present, and acquire the state data from the hard drive, for example by way of one or more low-level programming interfaces or the like.

In another embodiment, the collection component 110 can collect system state data by interacting with a storage service that has an image of the virtual hard disk. When a computer operates in a virtual environment, the computer does not boot off a physical hard drive. Rather, the computer boots off an image of a hard drive, a virtual hard disk (VHD) or other variants including but not limited to a virtual machine disk (VMDK) or a XenServer Virtual Appliance (XVA), provided by a storage service. In this case, the collection component 110 can acquire a copy of the hard drive from the storage service and the system state data, such as file data and computer information, can be acquired from the copy of the VHD. This embodiment is beneficial since there is no collection code running on the target machine and thus no performance impact associated with the code running on the target machine.

The virtual environment component 120 generates a virtual replica of a target computer from the system state data. The virtual replica of the target computer is produced on a second computer distinct and isolated from the target computer. Stated differently, an off-node representation of the target computer is created. A scanner operates over this virtual replica of the target computer to acquire and analyze data. In this manner, even if the scanner is a third-party scanner, independent of second-party execution platform (e.g., cloud computing platform, operating system . . . ), there is no impact to the target computer, and risks, like introduction of bugs or flaws or potential control of the target computer, are eliminated.

Figure 2:
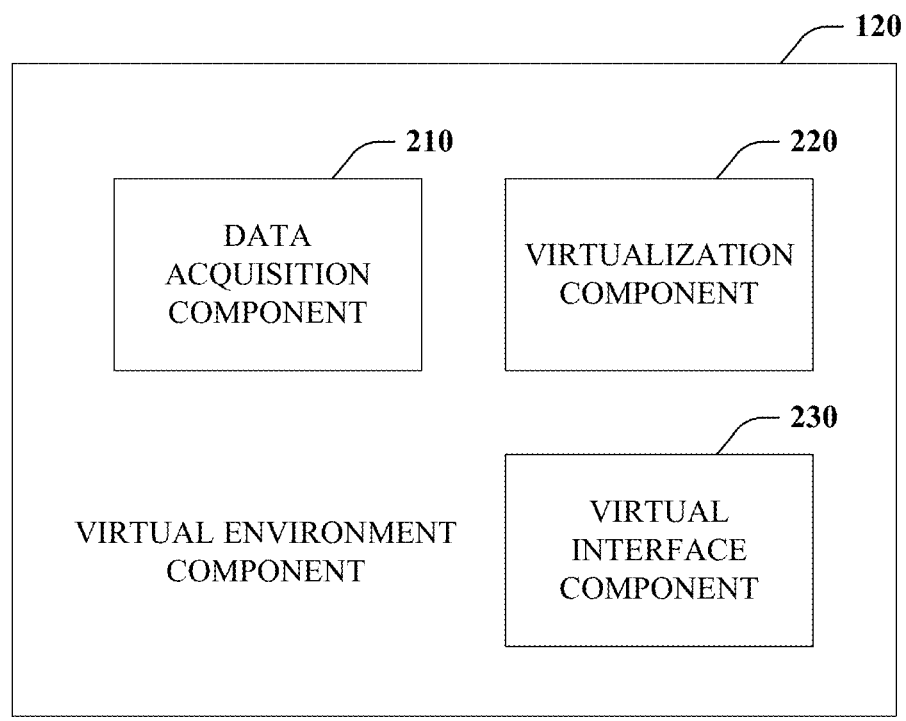
FIG. 2 is a block diagram of a sample virtual environment component.

Turning attention to FIG. 2, a sample virtual environment component 120 is illustrated in further detail. The virtual environment component 120 includes data acquisition component 210, virtualization component 220, and virtual interface component 230. The data acquisition component 210 is configured to receive, retrieve, or otherwise obtain or acquire system state data. In one instance, the data acquisition component 210 can retrieve the system state data from a network accessible store, such as a cloud store. Alternatively, data can be acquired directly from the collection component 110 or dedicated service. The virtualization component 220 generates a virtual replica of a target computer based on the system state data. The virtual replica of the target computer is executed on a second computer isolated from the target computer. The virtual replica of the target computer is an emulation of the target computer or portion thereof that executes on the second computer. Stated differently, the second computer is the host for a guest virtual target computer (virtual machine). Further, the virtual replica can be a full virtual replica or a partial virtual replica, wherein the partial virtual replica includes a subset of system state data, or artifacts, utilized by a particular scan specified in a manifest.

The virtual interface component 230 enables interaction with the virtual replica of the target computer on the second machine. In accordance with one embodiment, the virtual interface component 230 facilitates interaction with a computer scanner. The computer scanner can run unaltered on the second machine. However, requests will be intercepted and redirected from the second computer to the virtual replica of the target computer. For example, if a scanner requested the name of the computer, rather than returning the name of the second computer "Foo" on which the computer scanner is running or interacting with, the name of the virtual target computer "Bar" is used. In this manner, the scanner is unaware that information is coming from an offline copy of data about the computer. In a second embodiment, the scanner may be an altered version that is designed with knowledge that the scanner is not scanning a machine as conventionally done. Instead of asking the second computer for the information, the virtual interface component 230 is called. For example, a scanner can ask the virtual interface component 230 for a file in a directory and the virtual interface component 230 can retrieve the requested information from the virtual replica of the target computer, and return the result to the scanner. In a particular implementation, scanner functionality can be bifurcated between a scanner library and a scanner component or platform, wherein the scanner library runs on the second machine, retrieves data through the virtual interface component 230, and communicates the information to a scanner component running elsewhere.

Returning to FIG. 1, the scanner component 130 is configured to examine a computer with a particular aim such as performing vulnerability assessment, security investigation, forensic analysis or performance analysis, among others. In the vulnerability context, for example, the scanner component 130 evaluates the computer with the aim of determining vulnerabilities. This can be accomplished by comparing state data, such as file timestamps, with vulnerability signatures to determine if a software product has the most recent security patches or is not patched against publicly disclosed vulnerabilities. In one instance, the vulnerability or like signatures can be retrieved from an external network-accessible service. The scanner component 130 can be developed by many entities. It can be problematic in terms of security, however, when the scanner component 130 is developed by an entity independent of an entity that desires to employ the scanner on one or more of its computers.

Figure 3:
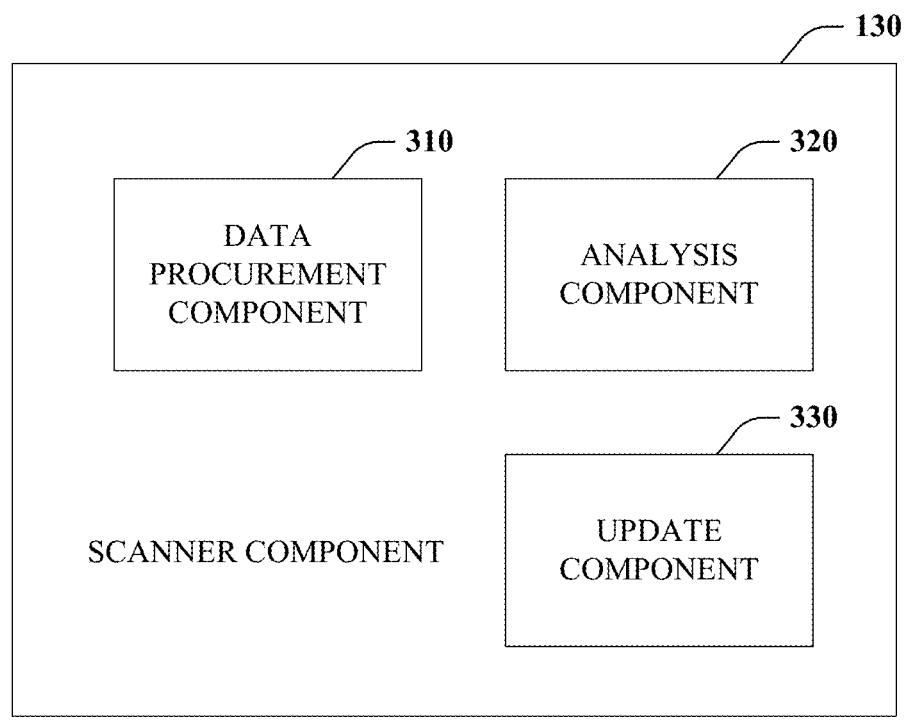
FIG. 3 is a block diagram of a sample scanner component.

Turning attention to FIG. 3, a sample scanner component 130 is depicted in further detail. The scanner component 130 includes data procurement component 310, analysis component 320, and update component 340.

The data procurement component 310 is configured to acquire data about a computer targeted for scanning. In one embodiment, the data procurement component 310 can request particular data from the operating system of a target computer. For example, the data procurement component 310 can request particular files, registry entries, running processes, or open ports, among other things from the operating system. As an alternative, the data procurement component 310 can request data using an interface such as the virtual interface component 230.

The analysis component 320 is configured to analyze or assess the data acquired by the data procurement component 310. The analysis performed is dependent on the type of scanner or the purpose of the scanner. In the context of a vulnerability scan, the analysis component 320 can acquire information about particular programs on a computer to determine whether or not the programs have the most recent patches. For example, a time stamp of a photograph editor program can be analyzed to determine whether or not the photograph editor program has the most recent patch installed. In the context of a performance scan, the settings can be analyzed to determine if the settings are causing the computer to run slow. In accordance with one embodiment, the analysis component 320 can perform analysis based on a signature or pattern and comparison to of signatures to acquired data. For example, the analysis component 320 could employ vulnerability signatures to determine weaknesses that could be exploited such as a lack of current patches.

The update component 330 is configured to update the scanner component 130. In one instance, the update component 330 can connect with a service periodically to determine whether or not there are new signatures. In the vulnerability context, patches for numerous programs can be released at any time. The update component 330 ensures that the analysis component 320 has access to the latest vulnerability signatures for use in accessing a computer.

Returning back to FIG. 1, the report component 140 of the scanning system 100 is configured to output a report based on the scan results. The report component 140 communicatively coupled directly or indirectly to the scanner component 130 so as to receive scan results. If the scanner component 130 generates a report based on the scan results, the report can be conveyed to a display device for display to a user. The report component 140 can also generate a report from the scan results that organizes, summaries, or correlates the scan results into meaningful information. A report can provide entities useful information about a computer depending on the type of scanner and purpose. In vulnerability context, for instance, the report can identify whether or not the computer is vulnerable based on currently installed patches and those available. Further, a government or other organization can impose compliance requirements involving computer scans, such as vulnerability scans. The report serves as evidence of compliance or lack of compliance with requirements.

Figure 4:
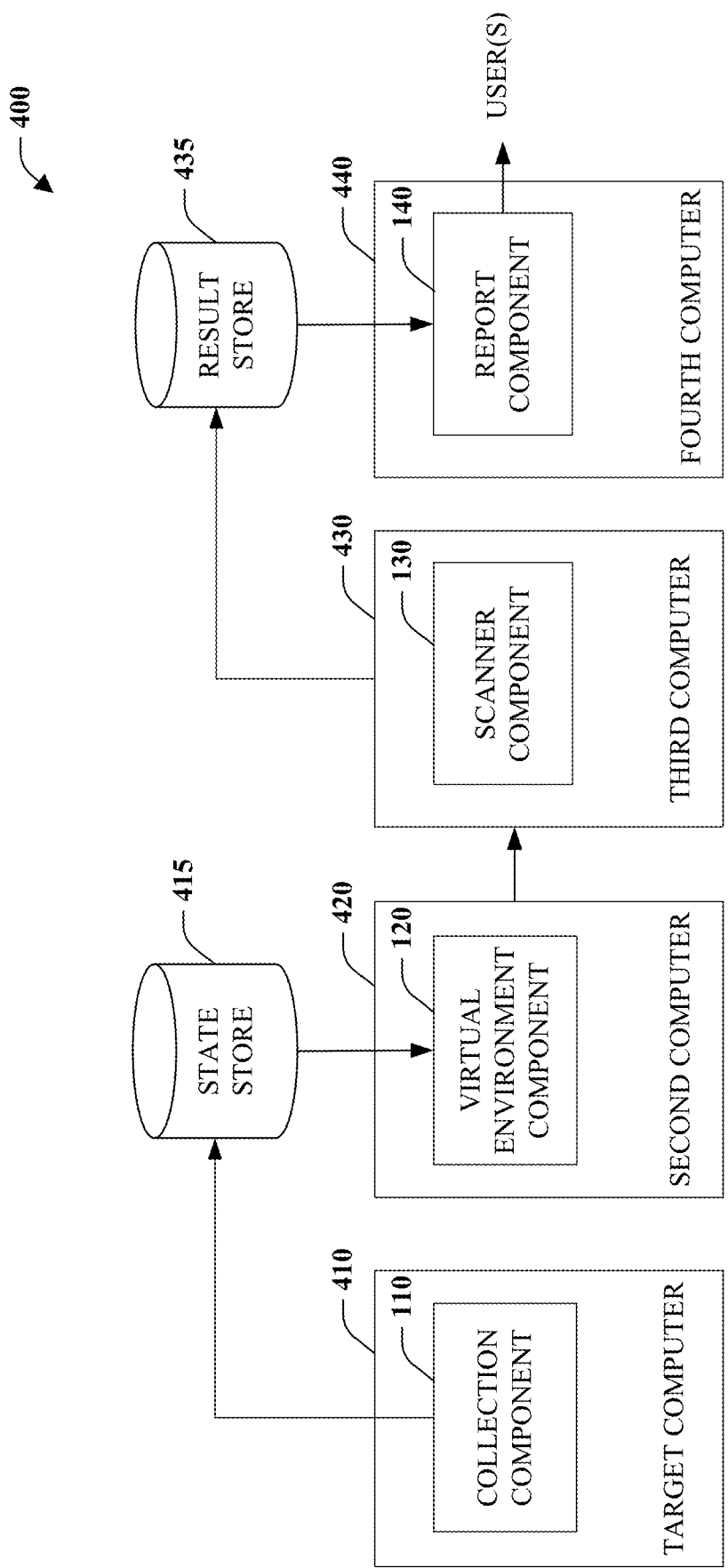
FIG. 4 is a block diagram of a first exemplary embodiment of an off-node scanning system.
Figure 5:
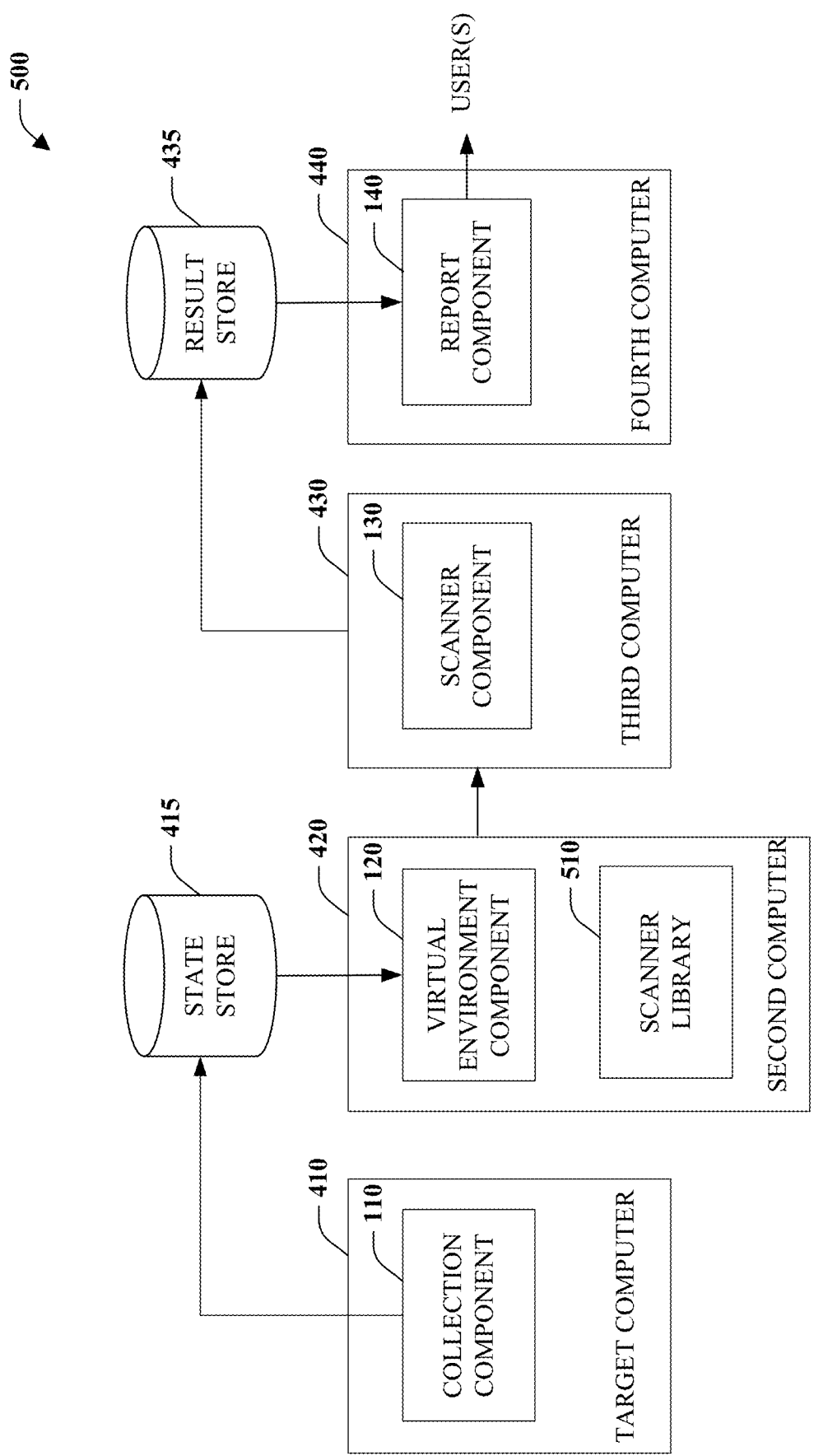
FIG. 5 is a block diagram of a second exemplary embodiment of an off-node scanning system.
Figure 6:
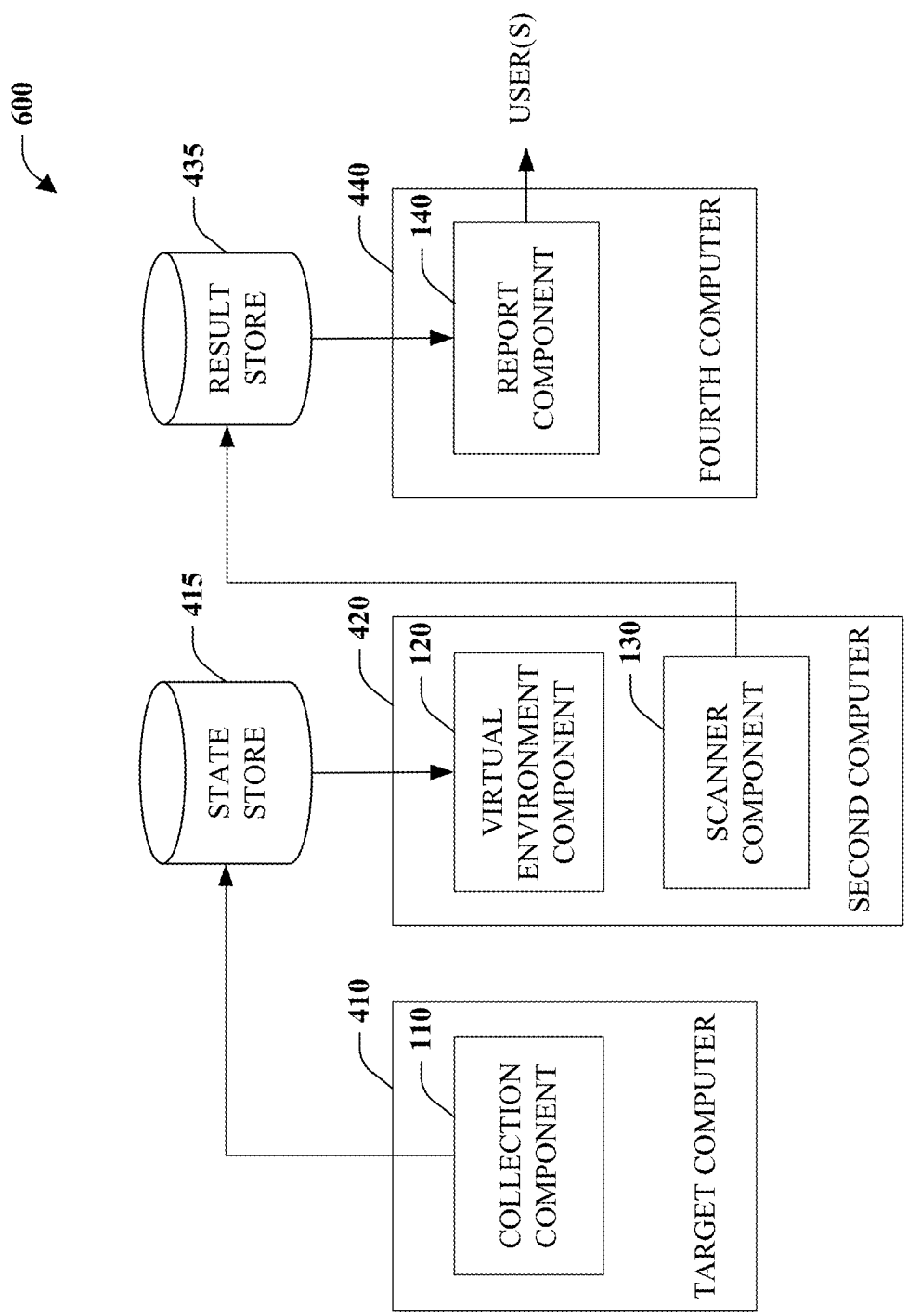
FIG. 6 is a block diagram of a third exemplary embodiment of an off-node scanning system.

FIGS. 4-6 illustrates different exemplary embodiments of the off-node scanning system 100 for purposes of clarity and understanding. Turning attention to initially to FIG. 5, a first exemplary embodiment of an off-node scanning system 500 is depicted. Here, the collection component 110 is executed on target computer 410, which is subject to a scan. The collection component 110 collects system state data from the target computer 410 and saves the data to network-accessible non-volatile state store 415. In one embodiment, the state store 415 includes limited access controls to prevent access and tampering with the data. The virtual environment component 420 is executed on second computer 420 different from the target computer 410. The virtual environment component 120 retrieves system state data from the state store 415 and uses the system state data to generate a full or partial virtual replica of the target component 410 on the second component 420. The scanner component 130 is executed on a third computer 430, which is communicatively coupled to the second computer 420, for example over a local or wide area network. The scanner component 130 can request data from the second computer, which can acquire the data from virtual replica of the target computer and return the data to the scanner component 130. The scanner component 130 can then analyze the data, for example by way of comparison to signatures, generate scan results, and save the scan results to a network-accessible non-volatile result store 435. Similar to state store 415, result store 435 can also have limited access control in place to prevent access and tampering with the scan results. The report component 140 is executed on fourth computer 440, which could correspond to an end-user computer. The report component 140 can acquire scan results including a report from the result store 435, or generate a report from the scan results from the result store 435, and communicate the report to a user. For example, the report can be disseminated by way of a dashboard displayed via graphical user interface.

FIG. 5 illustrates second exemplary embodiment of an off-node scanning system 500. The collection component 110 executes on the target computer 410, collects system state data from the target computer 410, and saves the system state data to the non-volatile network-accessible state store 415. The virtual environment component 120 executing on the second computer 420 isolated from the target computer 410 generates a virtual replica of the target computer on the second computer 420 based on system state data retrieved from the state store 415. Also included on the second computer 420 is scanner library component 510 including a portion of scanner functionality. In one embodiment, the scanner library component 510 can ask questions, receive answers to the questions, and generate a snapshot of data corresponding to the answers. For example, the snapshot can include file directory information such as the timestamp for a particular file. The snapshot of system state data is communicated to the scanner component 130 executing on the third computer 430. The scanner component 130, or platform, includes remaining scan functionality. For instance, using the timestamp of a file of the virtual target computer, the scanner component 130 can determine whether or not the target computer 410 is executing the most recent version of a program or has all patches. The scan results can be saved to the network-accessible result store 435. The report component 140 executing on the fourth computer 440 is able to retrieve the result data from the result store 435 and make it accessible to users by way of a dashboard of a graphical user interface, for example. In one embodiment, the scanner component can produce a report and save the report to the result store 435. In this case, the report component 140 can simply provide a mechanism to convey the report to users. In another embodiment, the report component 140 can generate a report based on the scan results and subsequently convey the generated report to users.

Turning attention to FIG. 6, a third exemplary embodiment of an off-node scanner system 600 is shown. As with previously described embodiments, the collection component 110 is installed and executed on the target computer 410, and is configured to collect system state data from the target computer 410 and save the data to the network-accessible state store 415. The virtual environment component 120 executes on the second computer 420, and creates a virtual replica of the target computer 410 on the second component 420 based on system state data retrieved from the network-accessible state store 415. The scanner component 130 is also resident on the second computer 420. The scanner component 130 can request data from the operating system of the second computer 420. The request will be hooked, or, in other words, intercepted, and forwarded to the virtual replica of the target computer. Once the scanner receives responses to all requests, the scan results can be saved to the network-accessible result store 435. The report component 140, executing on the fourth computer 440, can retrieve the scan results from the result store and make them accessible to users for example by rendering the results in a dashboard of a graphical user interface. In one instance, the scan results include a report that can be disseminated to a user. In another instance, the report component 140 can generate a report based on the scan results prior to conveying the report to users.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, the scanner component 130 can utilize such mechanisms to analyze data for a particular purpose.

In view of the exemplary systems described above, methodologies that may be implemented in accordance with the disclosed subject matter will be better appreciated with reference to the flow charts of FIGS. 7-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 7:
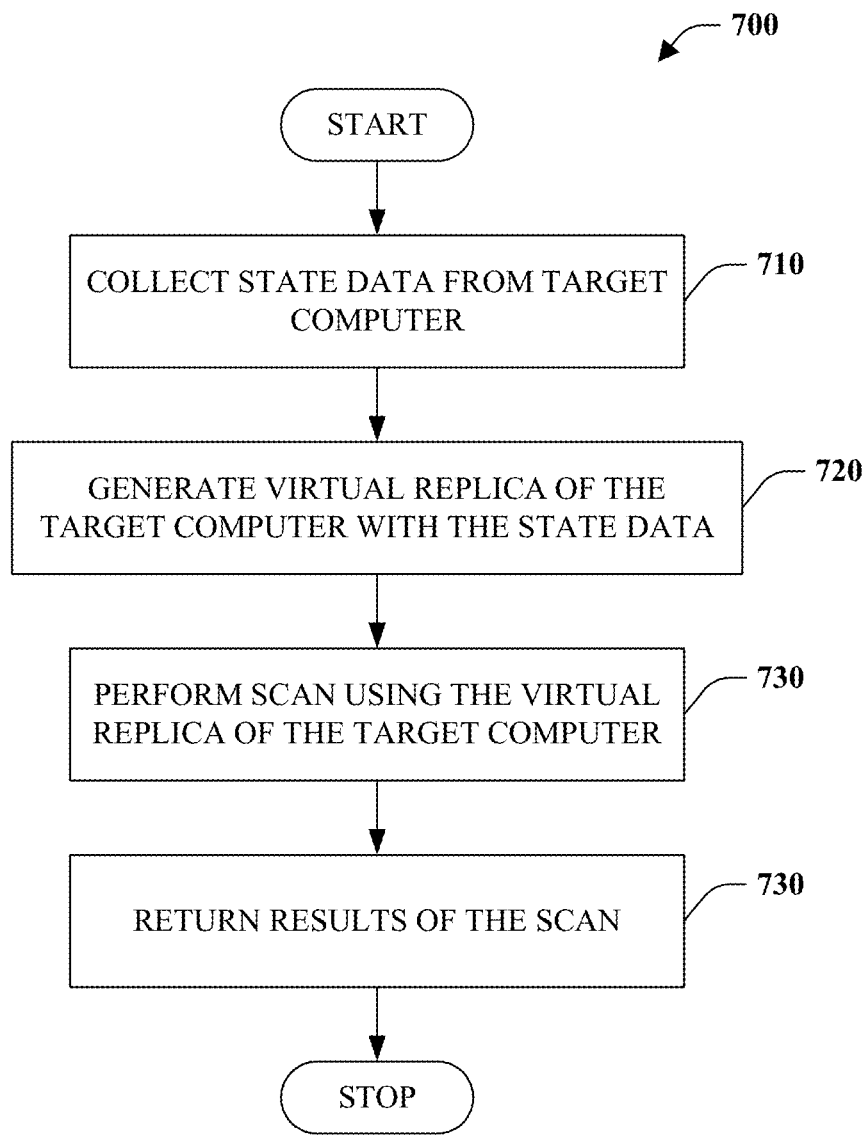
FIG. 7 is a flow chart diagram of a method of off-node scanning.

Referring to FIG. 7, a flow chart diagram of a method of off-node scanning 700 is depicted. At reference numeral 710, system state data is collected from a target computer. Although not limited thereto, a target computer can correspond to a server, a host machine, a guest virtual machine, or a bare metal machine. The system state data can include a file directory, registry information, identification of running processes, or a list of open ports, among other things supporting full or partial replication of the target computer. The system state data can be collected by a collection component 110, or collection agent, executing on the target machine. The collection component 110 can gather data by requesting the data from the operating system of the target computer or employing lower-level interfaces to acquire the data from disk. A virtual replica of the target computer can be generated based on the collected system state data, at reference numeral 720. In the case where solely a subset of state data is collected for a scan, the virtual replica need not be a full virtual replica, for example capable of full instantiation, but rather a partial virtual replica. The virtual replica of the target computer is generated on a second computer isolated from the target computer. At reference numeral 730, a scan can be triggered and performed over the virtual replica of the target component, as opposed to the target computer itself. In this manner, scanning is said to be performed off-node in that the scanning is not performed on a live or production computer but rather on a replica on a different node, or computer. This type of scanning may also be termed off-line scanning, but can be confusing as it is not meant to imply anything regarding network connectivity with respect to either the target computer or the computer hosting the virtual replica of the target computer, such as whether or not an Internet connection is required to be maintained in order to perform a scan. At reference numeral 740, scan results are returned. In one instance, scan results comprise a report that can be presented to interested users, for example, to ensure compliance with some regulation or agreement.

Figure 8:
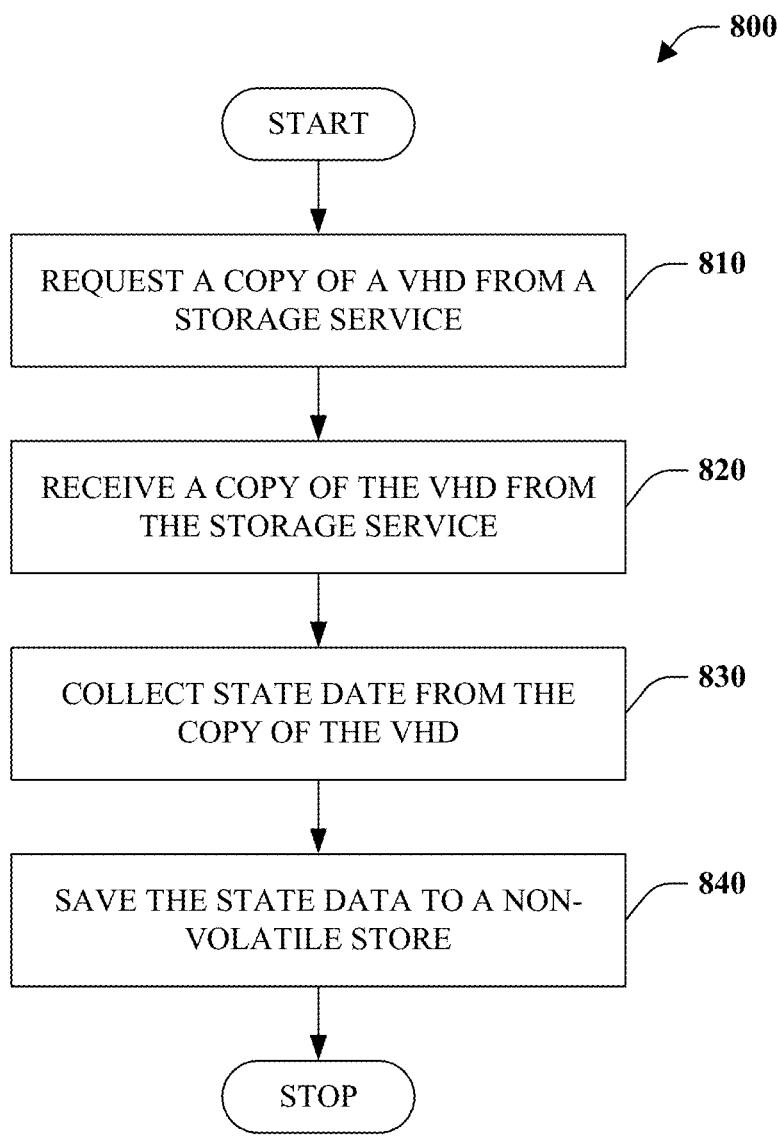
FIG. 8 is a flow chart diagram of a method of collecting state data.

FIG. 8 is a flow chart diagram of a method 800 of collecting state date from a computer, wherein the computer is a virtual machine. At reference numeral 810, a request is made for a copy of a virtual hard disk (VHD) of a target computer to a storage service. The storage service may comprise part of a virtual machine architecture that boots up virtual machines or computers based on an image or copy of the VHD as opposed to a physical hard drive. The request is made to this storage service for copy of the VHD. At reference numeral 820, a copy of the VHD is received from the storage service. At numeral 830, system state data is collected from the copy of the VHD, for example by applying functionality of the collection component 110 over the VHD. At reference numeral 840, the collected state data is saved to a non-volatile data store for subsequent access and processing. The method 800 is beneficial in that the collection of state data does not impose a cost on an executing target computer, since no collection code is running on the target computer.

Figure 9:
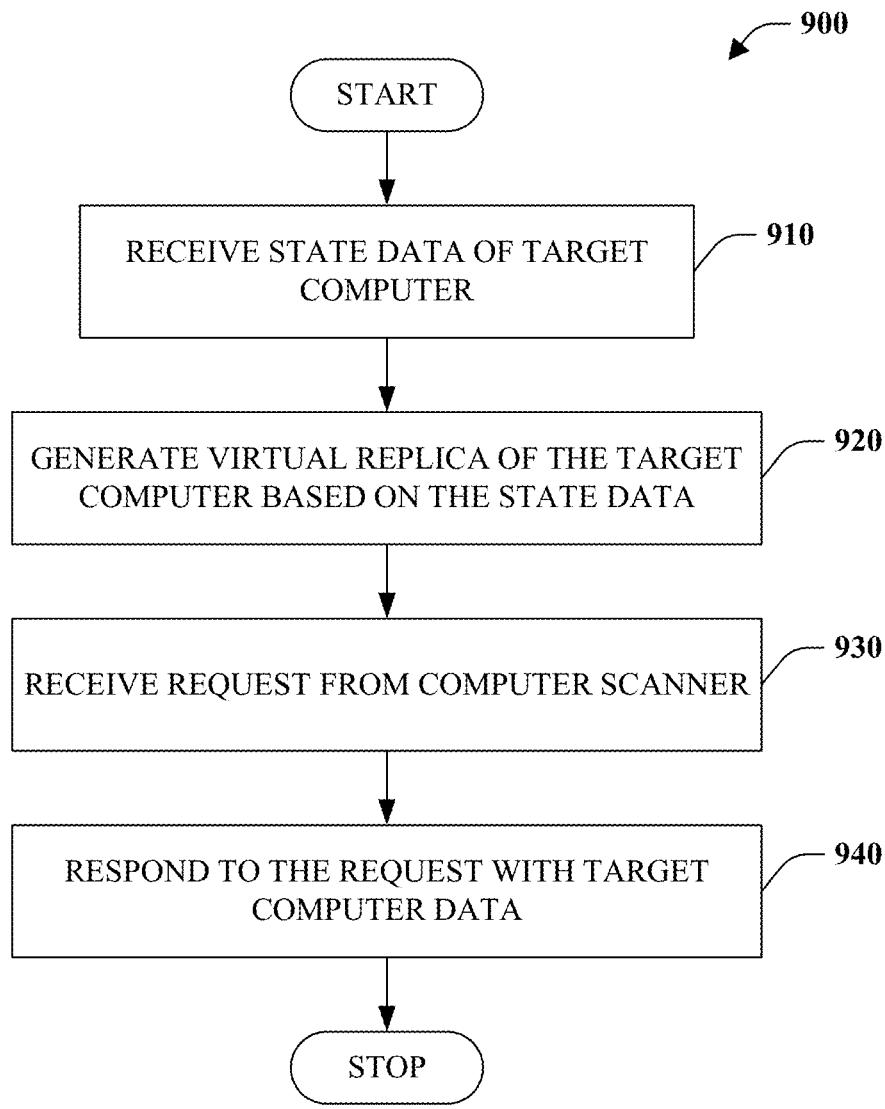
FIG. 9 is a flow chart diagram of a virtual environment method.

FIG. 9 illustrates a virtual environment method 900, for example associated with virtual environment component 120. At reference numeral 910, system state data of a target computer is received. In accordance with one embodiment, the state data for the target computer can be retrieved from a network-accessible, or cloud, data store. Other embodiments are also possible and contemplated including requesting the data from a web/network/cloud service dedicated to providing such data. At reference numeral 920, a virtual replica of the target computer is generated based on the state data received. The virtual replica of the target computer can be generated on a second computer distinct and isolated from the target computer. In other words, a virtual machine, corresponding to the target computer, is generated and executed as a guest hosted by the second computer. At numeral 930, a request is received from a computer scanner for data. In accordance with one embodiment, this request can be made on the second computer. In this case, the, an interface, hypervisor, virtual machine monitor, or the like can intercept the request and redirect the request to the virtual replica of the target computer. In another embodiment, a request can be made by way of an exposed interface (e.g., application programming interface) for that purpose. At numeral 940, a response to the request is communicated to the requesting computer scanner including information about the target computer, but without providing access to the original live or production version of the target computer.

Figure 10:
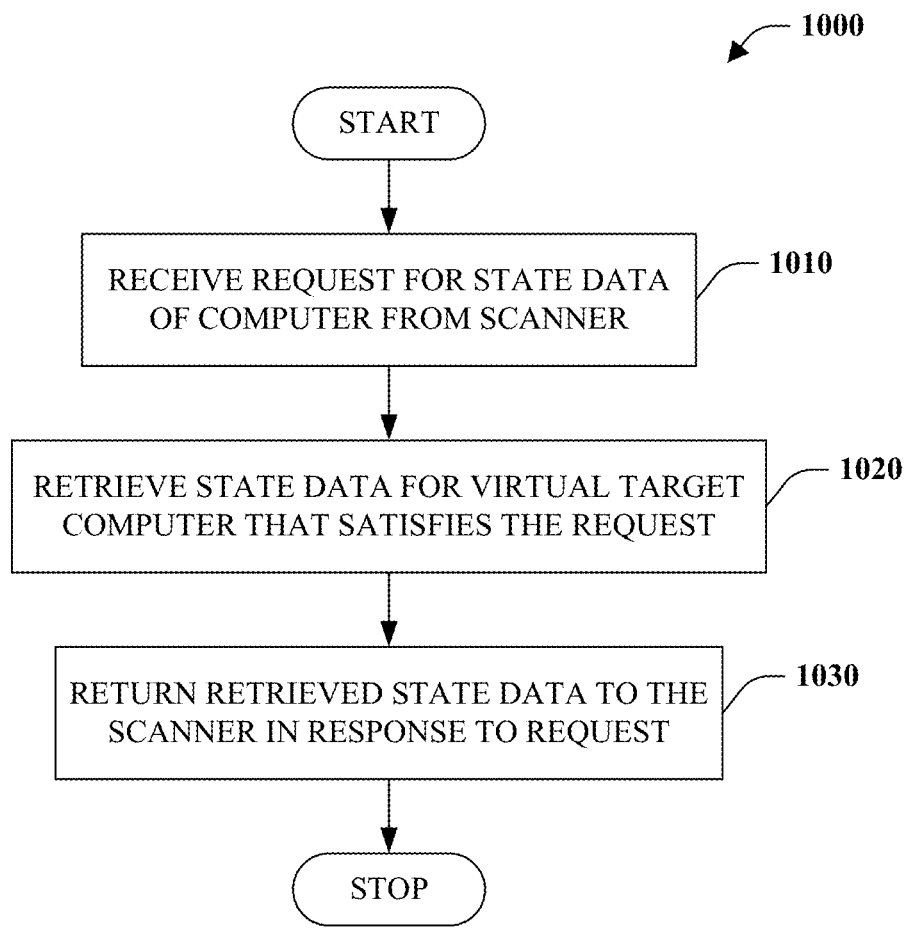
FIG. 10 is a flow diagram of a method for interfacing with a virtual environment.

FIG. 10 depicts a method of interfacing with a virtual environment 1000. At reference numeral 1010, a request is received for state data of a target computer from a scanner. For example, the request can be received by way of invocation of exposed calls of an interface associated with the target computer or a version thereof. At reference numeral 1020, state data of the target computer that satisfies the request is retrieved. For instance, a call can be made to a virtual replica of the target computer to acquire the data or some other source. At reference numeral 1030, the retrieved state data is returned to the scanner in response to the request. This method can be performed by an interface component such as an application programming interface to facilitate interaction between a provider of system state data and a consumer of system state data.

Figure 11:
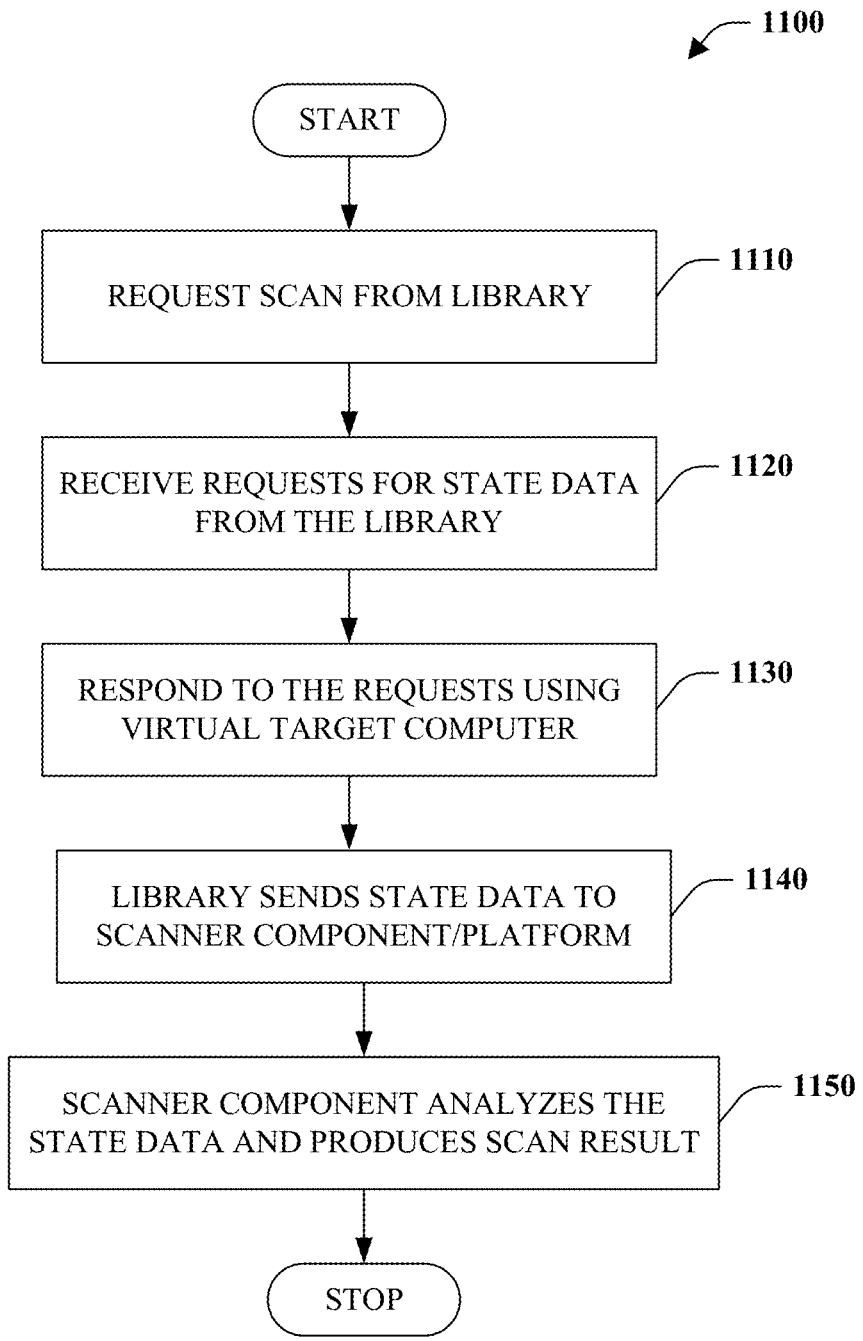
FIG. 11 is a flow chart diagram of a method of off-node scanning.

FIG. 11 is a flow chart diagram of a method of performing off-node scanning 1100 in accordance with one embodiment. At reference numeral 1110, a request to scan a target computer is made. This request can be manually or automatically triggered by some event. In the particular embodiment here, the request can be directed to a scanner library, which includes a subset of scanner functionality, as opposed to a scanner itself. In this context, the scanner library can be executed by a computer also executing a virtual replica of the target computer. At numeral 1120, a request will be received from the scanner library for state data of the target computer. For example, the scanner library may request a file directory, registry information, running processes and/or open communication ports. In response to the request, state data can be acquired from the virtual replica of the target computer and returned to the library. At reference numeral 1140, the library scanner sends the acquired state data to a scanner component or platform comprising the remaining scanner functionality. At reference numeral 1150, the scanner component analyzes the state data and produces a scan result. For example, in a vulnerability context, the scanner component can identify timestamps of particular files and determine whether or not the software associated with the files is the latest replica or has the latest patches the result of which can be output, for example as a vulnerability report.

Aspects of the subject disclosure pertain to the technical problem of computer security, including introduction of software bugs, associated with computer scanning (e.g., vulnerability, reliability, performance, security, forensic . . . ). The technical features associated with addressing this problem involve at least collecting state data of a target computer as well as generating and exposing a virtual replica of a target component on a second computer from which a scanner can acquire necessary data for analysis. Security is improved by reducing surface area exposed as part of a scanning process. More particularly, a computer scan can be performed without having access to or the ability to impact a live production computer subject to a scan. This kind of componentization and loosely coupled scanning process also enables scanning of other assets including containers and other small form factors where remote scanning or scanner agent installation is not possible.

The subject disclosure supports various products and processes that perform, or are configured to perform, various actions regarding computer scanning. What follows are one or more exemplary methods and systems.

A system that facilitates scanning of a computer comprises a processor coupled to a memory, the processor configured to execute the following computer executable components stored in the memory: a data acquisition component that receives system state data of a target computer; a virtualization component that generates a virtual replica of the target computer from the system state data on a second computer isolated from the target computer; and an interface component that provides a computer scanner access to the system state data of the target computer with the virtual replica of the target computer. The system further comprises a collection component, which can be executed on a target computer that collects the system state data from the target computer, collect the system state data from a copy of a virtual hard disk of the target computer provided by a storage service, or collect the system state data of the target computer and save the system state data externally to a nonvolatile data store accessible by the data acquisition component. The system further comprises an interface component that intercepts a request by the computer scanner to an operating system of an underlying computer executing the virtual replica of the target computer and returns data from the target computer that satisfies the request. The system further comprises a computer scanner developed by a second entity different from and independent of a first entity that provides a platform for execution of the target computer. Furthermore, the computer scanner can be an authenticated vulnerability scanner that scans a computer for security vulnerabilities. The system state further comprises a directory listing.

A method performed by a system comprising at least one processor coupled to a memory storing machine-executable instructions, which, when executed by the processor, controls the system to perform acts, comprising: generating a virtual replica of a target computer on a second computer, isolated from the target computer, based on state data collected from the target computer; receiving a request for the state data of the target computer from a computer scanner; retrieving the state data that satisfies the request from the virtual replica of the target computer; and providing retrieved state data to the computer scanner in response to the request. The method further comprises collecting the state data from a collection component executed on the target computer. The method further comprises requesting a copy of a virtual hard disk of the target computer from a storage service, and collecting the state data from the copy of a virtual hard disk received in response to the request. In addition, the method further comprises collecting state data from the target computer, and storing the state data to a non-volatile store external to the target computer. The method also comprises loading a third-party computer scanner on the second computer configured to request the state data. Furthermore, the method comprises intercepting the request by the computer scanner for the state data from the target computer, and retrieving the state data from the target computer that satisfies the request from the virtual replica of the target computer. The method further comprises loading a third-party scanner library on the second computer configured to request the state data and communicate with a third-party computer scanner component, executable on a third computer, configured to analyze the state data and return a scan result. The method further comprises receiving a report based on a scan result, and conveying, for display on a display device, the report.

A computer-readable storage medium having instructions stored thereon that enable at least one processor to perform a method upon execution of the instructions, the method comprising: generating virtual replica of a target computer on a second computer isolated from the target computer with state data of the target computer; receiving a request for the state data of the target computer from a third-party vulnerability scanner; retrieving the state data of the target computer that satisfies the request from the virtual replica of the target computer on the second computer; and returning the state data to the third-party vulnerability scanner in response to the request. The method further comprising collecting the state data from the target computer with a first-party collection component installed on the target computer. Additionally, the method comprises collecting the state data from a copy of a virtual hard disk of the target computer provided by a storage service. The method further comprises receiving a vulnerability assessment from the third-party vulnerability scanner based on scan results.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 12:
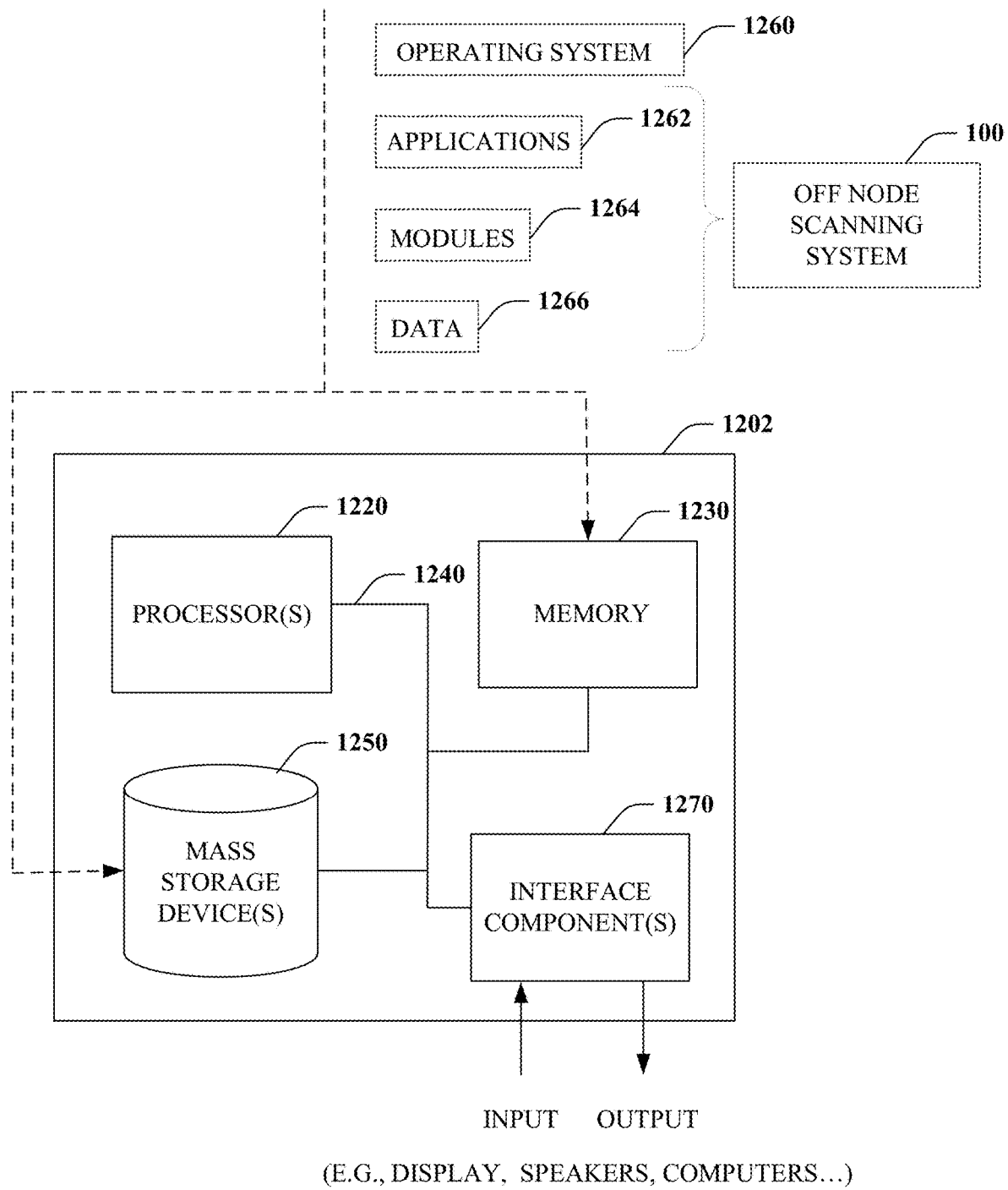
FIG. 12 is a schematic block diagram illustrating a suitable operating environment for aspects of the subject disclosure.

In order to provide a context for the claimed subject matter, FIG. 12 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory devices.

With reference to FIG. 12, illustrated is an example general-purpose computer or computing device 1202 (e.g., desktop, laptop, tablet, watch, server, hand-held, programmable consumer or industrial electronics, set-top box, game system, compute node . . . ). The computer 1202 includes one or more processor(s) 1220, memory 1230, system bus 1240, mass storage device(s) 1250, and one or more interface components 1270. The system bus 1240 communicatively couples at least the above system constituents. However, it is to be appreciated that in its simplest form the computer 1202 can include one or more processors 1220 coupled to memory 1230 that execute various computer executable actions, instructions, and or components stored in memory 1230.

The processor(s) 1220 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1220 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) can be a graphics processor.

The computer 1202 can include or otherwise interact with a variety of computer-readable media to facilitate control of the computer 1202 to implement one or more aspects of the claimed subject matter. The computer-readable media can be any available media that can be accessed by the computer 1202 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computer 1202. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 1230 and mass storage device(s) 1250 are examples of computer-readable storage media. Depending on the exact configuration and type of computing device, memory 1230 may be volatile (e.g., RAM), non-volatile (e.g., ROM, flash memory . . . ) or some combination of the two. By way of example, the basic input/output system (BIOS), including basic routines to transfer information between elements within the computer 1202, such as during start-up, can be stored in nonvolatile memory, while volatile memory can act as external cache memory to facilitate processing by the processor(s) 1220, among other things.

Mass storage device(s) 1250 includes removable/non-removable, volatile/non-volatile computer storage media for storage of large amounts of data relative to the memory 1230. For example, mass storage device(s) 1250 includes, but is not limited to, one or more devices such as a magnetic or optical disk drive, floppy disk drive, flash memory, solid-state drive, or memory stick.

Memory 1230 and mass storage device(s) 1250 can include, or have stored therein, operating system 1260, one or more applications 1262, one or more program modules 1264, and data 1266. The operating system 1260 acts to control and allocate resources of the computer 1202. Applications 1262 include one or both of system and application software and can exploit management of resources by the operating system 1260 through program modules 1264 and data 1266 stored in memory 1230 and/or mass storage device(s) 1250 to perform one or more actions. Accordingly, applications 1262 can turn a general-purpose computer 1202 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, off-node scanning system 100, or portions thereof, can be, or form part, of an application 1262, and include one or more modules 1264 and data 1266 stored in memory and/or mass storage device(s) 1250 whose functionality can be realized when executed by one or more processor(s) 1220.

In accordance with one particular embodiment, the processor(s) 1220 can correspond to a system on a chip (SOC) or like architecture including, or in other words integrating, both hardware and software on a single integrated circuit substrate. Here, the processor(s) 1220 can include one or more processors as well as memory at least similar to processor(s) 1220 and memory 1230, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the off-node scanning system 100 and/or associated functionality can be embedded within hardware in a SOC architecture.

The computer 1202 also includes one or more interface components 1270 that are communicatively coupled to the system bus 1240 and facilitate interaction with the computer 1202. By way of example, the interface component 1270 can be a port (e.g. serial, parallel, PCMCIA, USB, FireWire . . . ) or an interface card (e.g., sound, video . . . ) or the like. In one example implementation, the interface component 1270 can be embodied as a user input/output interface to enable a user to enter commands and information into the computer 1202, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 1270 can be embodied as an output peripheral interface to supply output to displays (e.g., LCD, LED, plasma . . . ), speakers, printers, and/or other computers, among other things. Still further yet, the interface component 1270 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system comprising:
   one or more processors; and
   one or more hardware storage devices having stored thereon instructions that are executable by the one or more processors to configure the system to facilitate secure scanning of other computing systems while reducing risk introduced by computer scanners, including instructions that are executable to configure the computer system to perform at least the following:

receiving system state data of a target computer;

generating a virtual replica of the target computer, from the system state data, on a second computer isolated from the target computer; and providing a computer scanner access to the system state data of the target computer with the virtual replica of the target computer, while preventing the computer scanner from having access to the target computer.

2. The system of claim 1 further comprising collecting the system state data from the target computer.

3. The system of claim 1 further comprising collecting the system state data from a copy of a virtual hard disk of the target computer provided by a storage service.

4. The system of claim 1 further comprising collecting the system state data of the target computer and saving the system state data externally to a nonvolatile data store accessible by the data acquisition component.

5. The system of claim 1, further comprising intercepting a request by the computer scanner to an operating system of an underlying computer executing the virtual replica of the target computer and returning data from the target computer that satisfies the request.

6. The system of claim 1, wherein the computer scanner is developed by a second entity different from and independent of a first entity that provides a platform for execution of the target computer.

7. The system of claim 1, wherein the computer scanner is an authenticated vulnerability scanner that scans a computer for security vulnerabilities.

8. The system of claim 7, wherein the system state data comprises a directory listing.

9. A method performed by a computing system comprising at least one processor coupled to a memory storing machine-executable instructions, the method comprising:

generating a virtual replica of a target computer on a second computer, isolated from the target computer, based on state data collected from the target computer;

receiving a request for the state data of the target computer from a computer scanner;

retrieving the state data that satisfies the request from the virtual replica of the target computer; and providing retrieved state data to the computer scanner in response to the request, while preventing the computer scanner from having access to the target computer, thereby reducing risk introduced by the computer scanner.

10. The method of claim 9 further comprising collecting the state data from a collection component executed on the target computer.

11. The method of claim 9 further comprising:

requesting a copy of a virtual hard disk of the target computer from a storage service; and collecting the state data from the copy of a virtual hard disk received in response to the request.

12. The method of claim 9 further comprising:

collecting state data from the target computer; and storing the state data to a non-volatile store external to the target computer.

13. The method of claim 9 further comprising loading a third-party computer scanner on the second computer configured to request the state data.

14. The method of claim 9 further comprising:

intercepting the request by the computer scanner for the state data from the target computer; and retrieving the state data from the target computer that satisfies the request from the virtual replica of the target computer.

15. The method of claim 9 further comprising loading a third-party scanner library on the second computer configured to request the state data and communicate with a third-party computer scanner component, executable on a third computer, configured to analyze the state data and return a scan result.

16. The method of claim 9 further comprising:

receiving a report based on a scan result; and conveying, for display on a display device, the report.

17. A computer-readable storage medium having instructions stored thereon that enable at least one processor to perform a method upon execution of the instructions, the method comprising:

generating a virtual replica of a target computer, on a second computer distinct from the target computer, with state data of the target computer;

receiving a request for the state data of the target computer from a third-party vulnerability scanner;

retrieving the state data of the target computer that satisfies the request from the virtual replica of the target computer on the second computer;

returning the state data to the third-party vulnerability scanner in response to the request, while preventing the third-party vulnerability scanner from having access to the target computer, thereby reducing risk introduced by the third-party vulnerability scanner; and receiving a vulnerability assessment based on a scan of the state data.

18. The computer-readable storage medium of claim 17 further comprising collecting the state data from the target computer with a collection component installed on the target computer.

19. The computer-readable storage medium of claim 17 further comprising collecting the state data from a copy of a virtual hard disk of the target computer provided by a storage service.

20. The computer-readable storage medium of claim 17 wherein the vulnerability assessment is received from the third-party vulnerability scanner based on the scan of the state data.

* * * * *